United States Patent
Hacker

(10) Patent No.: US 7,354,096 B2
(45) Date of Patent: Apr. 8, 2008

(54) PORTABLE, ELEVATED SUN PROTECTION FOR VEHICLES

(76) Inventor: James Theodore Hacker, 4218 Inverrary Blvd., Apt 94B, Lauderhill, FL (US) 33319

( * ) Notice: Subject to any disclaimer, the term of this patent is extended or adjusted under 35 U.S.C. 154(b) by 276 days.

(21) Appl. No.: 11/339,001

(22) Filed: Jan. 25, 2006

(65) Prior Publication Data

US 2007/0186966 A1    Aug. 16, 2007

Related U.S. Application Data

(60) Provisional application No. 60/647,475, filed on Jan. 27, 2005.

(51) Int. Cl.
*B60J 7/00* (2006.01)
(52) U.S. Cl. .................................. 296/136.12
(58) Field of Classification Search ................. 296/163, 296/136.01, 136.1, 136.11, 136.12, 136.13
See application file for complete search history.

(56) References Cited

U.S. PATENT DOCUMENTS 5,660,425 A * 8/1997 Weber ......................... 296/163
6,935,674 B1 * 8/2005 Campos ....................... 296/98

* cited by examiner

*Primary Examiner*—Joseph D Pape

(57) ABSTRACT

A shade producing apparatus for protecting the exterior and interior of an automobile, truck or vehicle as well it's passengers. A shade producing canopy supported by poles extending either from the rear trunk or from on top of the roof of a vehicle. The entire folding or collapsible poles and canopy are stored in a hollow airfoil shaped spoiler that is esthetically pleasing and adds to the appearance of the vehicle. The base of the airfoil shaped spoiler's two risers are attached to the vehicle. The two tie-down bungee cords are the only other parts that touch the surface of the vehicle. An operator may deploy and retract the shade canopy while remaining on one side of the vehicle. The supporting poles may be swiveled 180 degrees to form a shade awning to the rear of the vehicle.

1 Claim, 9 Drawing Sheets

PORTABLE, ELEVATED SUN PROTECTION FOR VEHICLES

CROSS-REFERENCE TO RELATED APPLICATIONS

This application is entitled to the benefit of Provisional Patent Application Ser. No. 60/647,475 filed Jan. 27, 2005.

FEDERALLY SPONSORED RESEARCH

Not Applicable

SEQUENCE LISTING OR PROGRAM

Not Applicable

BACKGROUND OF THE INVENTION

Field of Invention

This invention relates to the portable protection of vehicles from the damaging rays of direct sunlight.

BACKGROUND OF THE INVENTION

I invented a sun protection device for automobiles which does not make contact with the painted surfaces of the vehicle. There are hundreds of car protection devices available in concept and on the market but they all have one flaw in common: they try to protect the vehicle from every eventuality of nature, including sun, rain, sleet, hail, wind and flying debris. Most of them require that the protection device make contact along painted surfaces, or is a major construction project with considerable clumsy parts or partitions to assemble.

BACKGROUND OF INVENTION

Objects and Advantages

My invention deals primarily with one damaging factor to automobiles: sun rays. Sun rays are responsible for most of the damage incurred by vehicles to their painted exterior, rubber molding, trim and seals. Heat build-up and direct rays damage dashboard and rear shelf materials and interior upholstery. Indirectly, heat, generated by sun rays, can also be responsible for electrical wiring deterioration. The obvious solution is to keep a vehicle in a garage the majority of its' useful life. Since most vehicle owners use their cars for transportation to and from work, it makes that solution impractical. Many different nylon covers have been invented and marketed but are rarely used because of the damage the cover itself can do to the vehicle paint surfaces due to chafing, rubbing and extended wet contact. Most nylon or other wrap-around covers are usually only used once or twice and then discarded. The principal reason for this waste is cumbersomeness of deploying the cover and then after retraction the problem of where to store the cover—especially if it is wet.

My invention only makes contact with the vehicle at three anchor points: the rear airfoil stabilizer and two front side mirrors or two front fenders. A very light weight and waterproof aluminized polyester or other similar material with a very high sun protection factor, is elevated over the vehicle surface by arched expandable poles stressed between the anchor points. Like an umbrella, it is easy to open and close. Air slits are placed along the length to alleviate any ballooning from wind or water accumulation. Upon closing, the canopy and poles conveniently store inside the rear air spoiler. My elevated canopy lowers interior vehicle temperatures through shade and eliminates any heat build-up between vehicle roof and canopy through the air circulation space between vehicle roof and canopy. This produces interior heat reduction through 95% elimination of heat conduction from the canopy to the vehicle roof.

My sun protection and shade device is superior to previous products because: It is built into an already popular attachment to the automobile—a rear air spoiler wing. It is portable so that it can be deployed and retracted in parking lots or work places in seconds. It is housed in an airfoil spoiler thus adding popular attractive esthetics to the vehicle. It is designed for a single purpose of sun protection so is not cumbersome like other products which purport to protect against all elements of nature. It does not produce a chaffing or mildew problem and is easy to deploy and retract.

DRAWINGS

Figures

DETAILED DESCRIPTION

FIGS. 1,2,3,4,5-Preferred Embodiment

Figure 1:
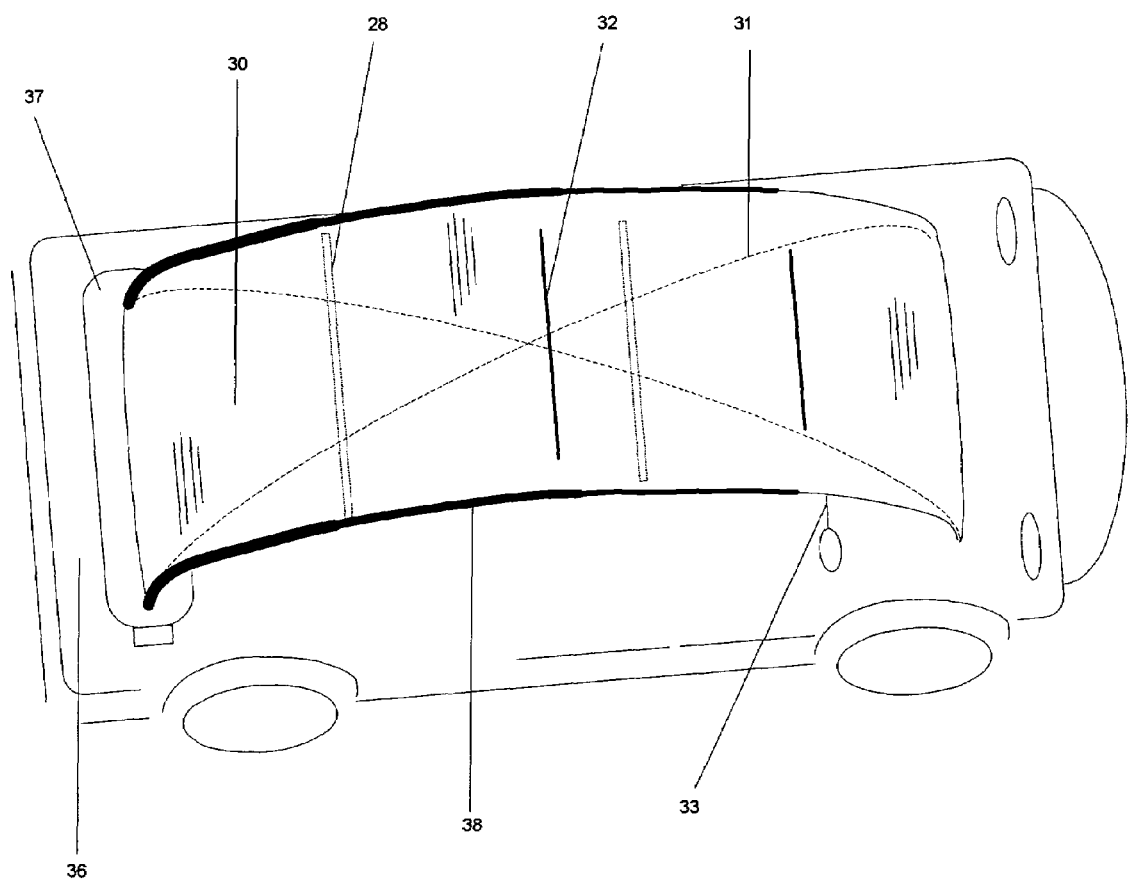
FIG. 1 is a perspective view showing the sun-canopy in place over the expandable poles.
Figure 3:
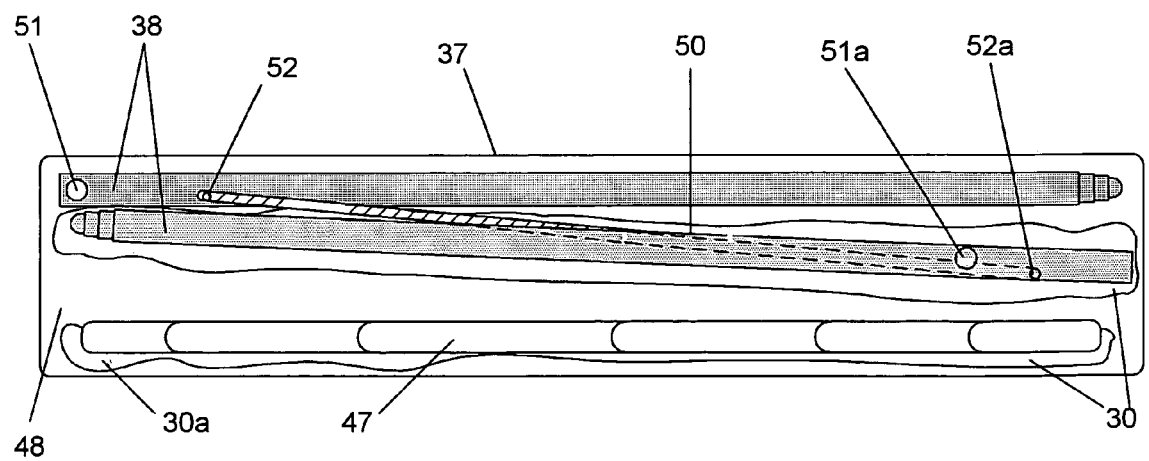
FIG. 3 is a top view of the airfoil platform, open, with the poles in the stored or retracted position.
Figure 4:
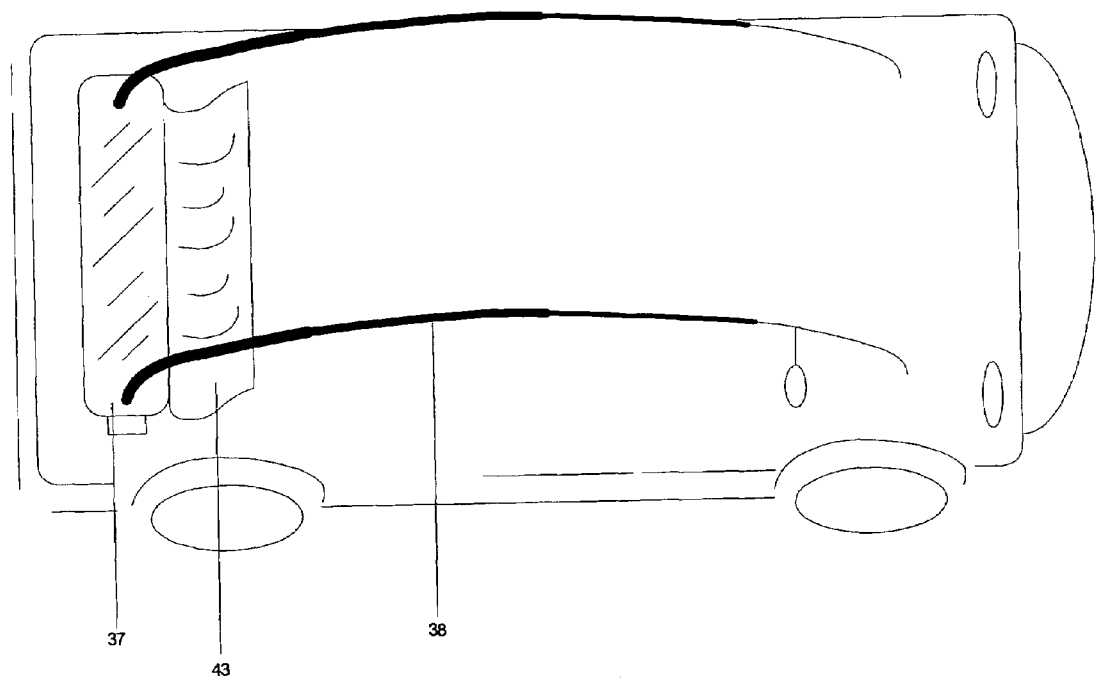
FIG. 4 is a side view showing the bend and stress of the expandable rods projecting from the deployed airfoil base and anchored at the front bumpers of the vehicle.
Figure 5:
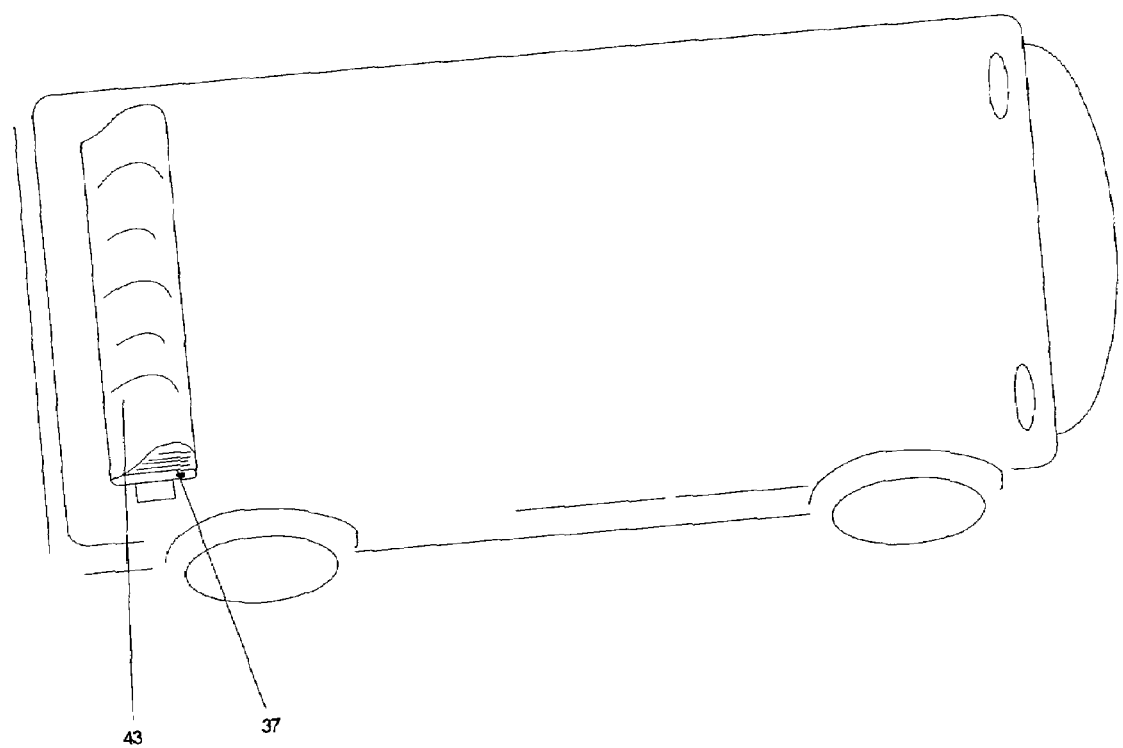
FIG. 5 is a top view showing the bend and stress of the expandable rods projecting from the deployed airfoil base and anchored at the front side mirrors of the vehicle.

A preferred embodiment of my invention of portable shade and sun ray protection for vehicles is depicted in FIGS. 1,2,3,4,5. In FIG. 1 this embodiment has the airfoil spoiler base 37 located and fixed to the rear vehicle trunk lid 36. The expandable poles 38, more specifically shown in FIG. 5, are parallel to each other and secured at the front side mirrors 33. A bungee expandable pole cord with a Velcro attachment secures the poles to the mirror but also allows some movement from wind or air currents. The aluminized polyester or other similar material canopy 30 is stressed tight over the poles by the bend and stress of the poles. The bend and stress of the poles and canopy create a slope both forward and aft for quick rain water run-off. Air slits or vents 32 may be placed in the canopy to prevent distortions in the protective shape by strong air currents. Very light weight battans 28 may be necessary only for large automobiles or trucks. However, the battans 28 are very necessary if the user decided to use the 'X' 31 shaped pole embodiment.

Figure 2:
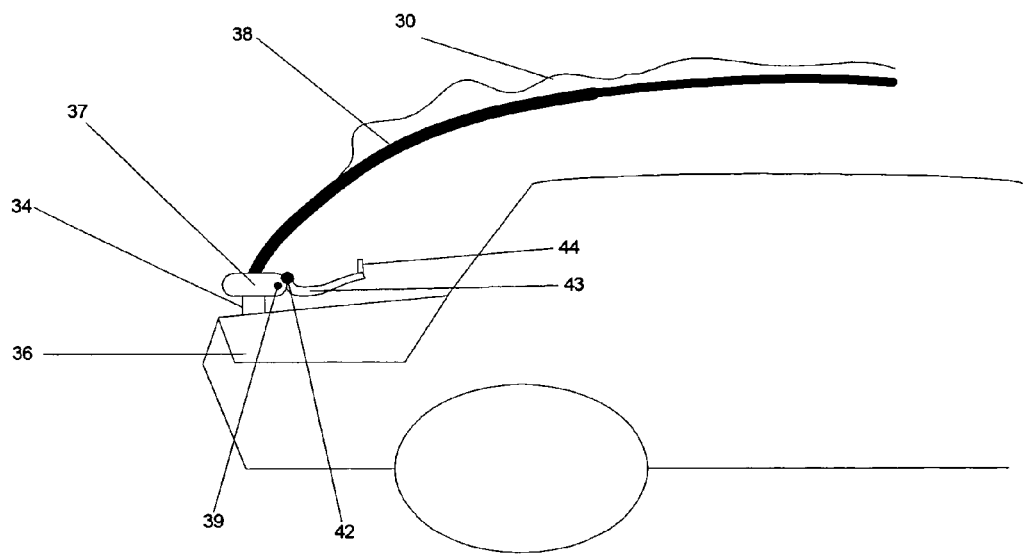
FIG. 2 is a side view of the air spoiler system in the open or deployed position.

FIG. 2 shows the airfoil spoiler cover 43 attached to the base 37 by a piano hinge 42 and in the open or deployed position. The expandable poles 38 are deployed in the forward configuration. The base 37 is secured to the vehicle trunk lid 36 by two risers 34 bolted to the trunk lid 36 as is the case with most other decorative rear spoiler systems. The airfoil shaped spoiler lid 43 has enough open volume when closed to contain both expandable poles 38 and aluminized polyester or other similar material canopy 30. A bayonet clip lock secures the airfoil shaped spoiler lid when closed.

In FIG. 3 the two expandable poles 38 are secured to the spoiler base at attach points 51 & 51a by bolts or similar hardware. The attach points 51 & 51a are at different positions on each expandable pole. The attach point 51 on the forward expandable pole is very close to end of the largest diameter pole in the combination of expandable poles. The attach point 51a of the second expandable pole is located several inches away from the end of the largest diameter pole in the combination of expandable poles. The inter connecting rod 50 is also attached to the two expandable poles at different locations on each expandable pole. By off-setting the attach points of the inter connecting rod 52 & 52a on the expandable poles the same amount as the expandable poles are off-set in their attach points 51 & 51a a leveraged effect takes place when the operator moves one expandable pole into the forward deployed position. The operator merely has to move one expandable pole to the deployed position and the other expandable pole will also deploy in like manor. The result is that the operator can deploy or retract the expandable poles from either side of the vehicle, without going back and forth to each side, thus saving time and steps. The light weight waterproof aluminized polyester or other similar material canopy may be stored loosely around the expandable poles 30 or on a window shade 47 type spring loaded roller 30a.

FIG. 4 shows a more explicit view of the expandable poles 38 in the deployed position. Also shown is the attach points of the expandable poles 38 to the airfoil base 37 and the open position of the airfoil shaped spoiler cover 43. The inter-connecting rod configuration is not depicted. The port or left side expandable pole is shown in the mirror anchor point configuration.

In FIG. 5 the airfoil shaped spoiler cover 43 is in the closed position on the spoiler base 37.

Figure 6:
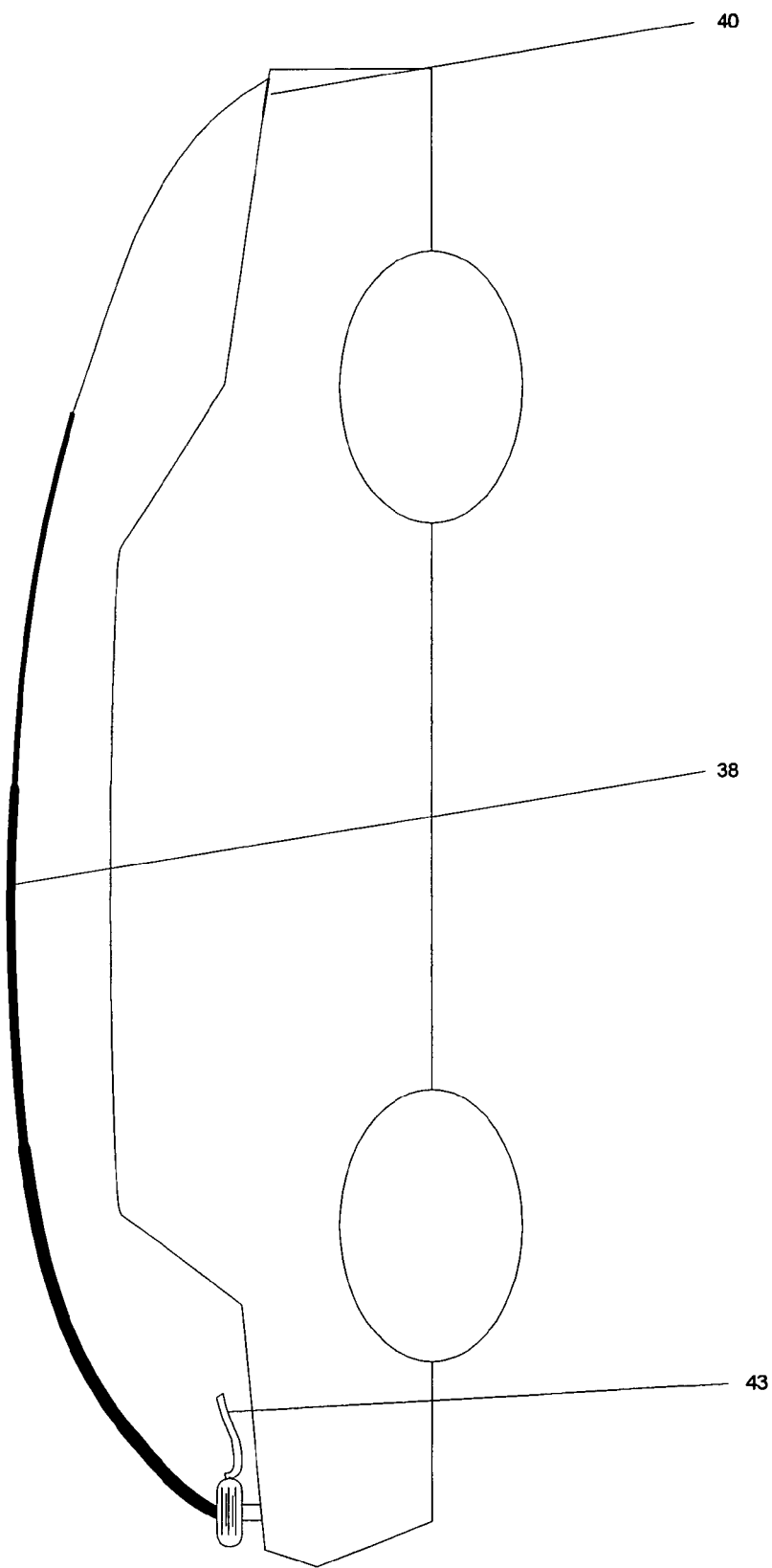
FIG. 6 is a top perspective view showing the airfoil spoiler, containing the expandable poles, in the closed or retracted position.

FIG. 6 shows an alternate embodiment where the expandable poles are extended to their full length and anchored at the front engine hood with bungee connected to a Velcro securing device 40. The airfoil shaped spoiler cover is in the open or deployed position.

Figure 7:
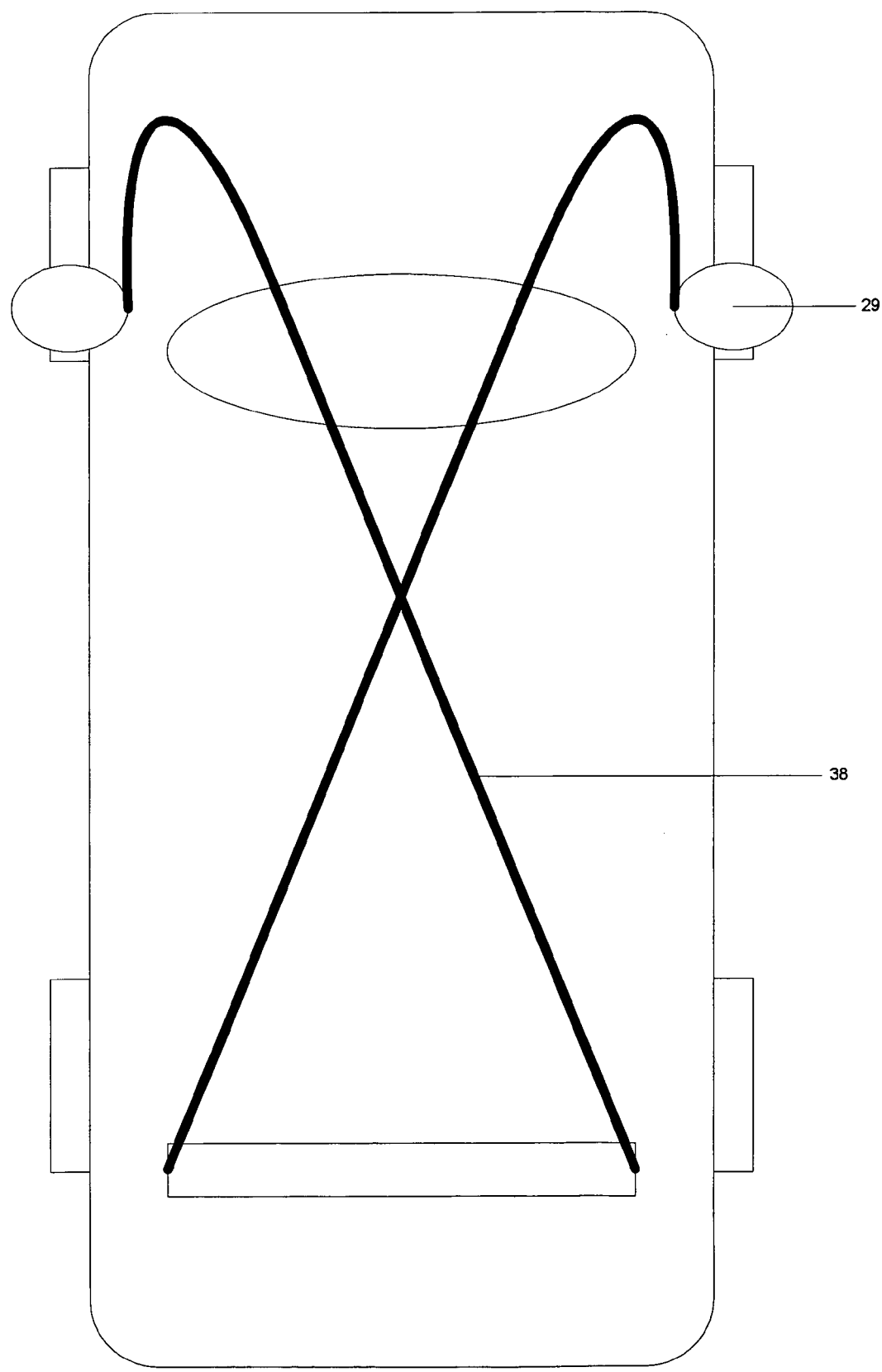
FIG. 7 is a top view of the expandable poles in the 'X' position anchored at the front side mirrors.

In FIG. 7 an alternate embodiment of placing the expandable poles 38 in an 'X' position with anchor points at the front side mirrors 29 is shown. In the 'X' position battans secured into the canopy would become necessary thus making this embodiment less desirable.

Figure 8:
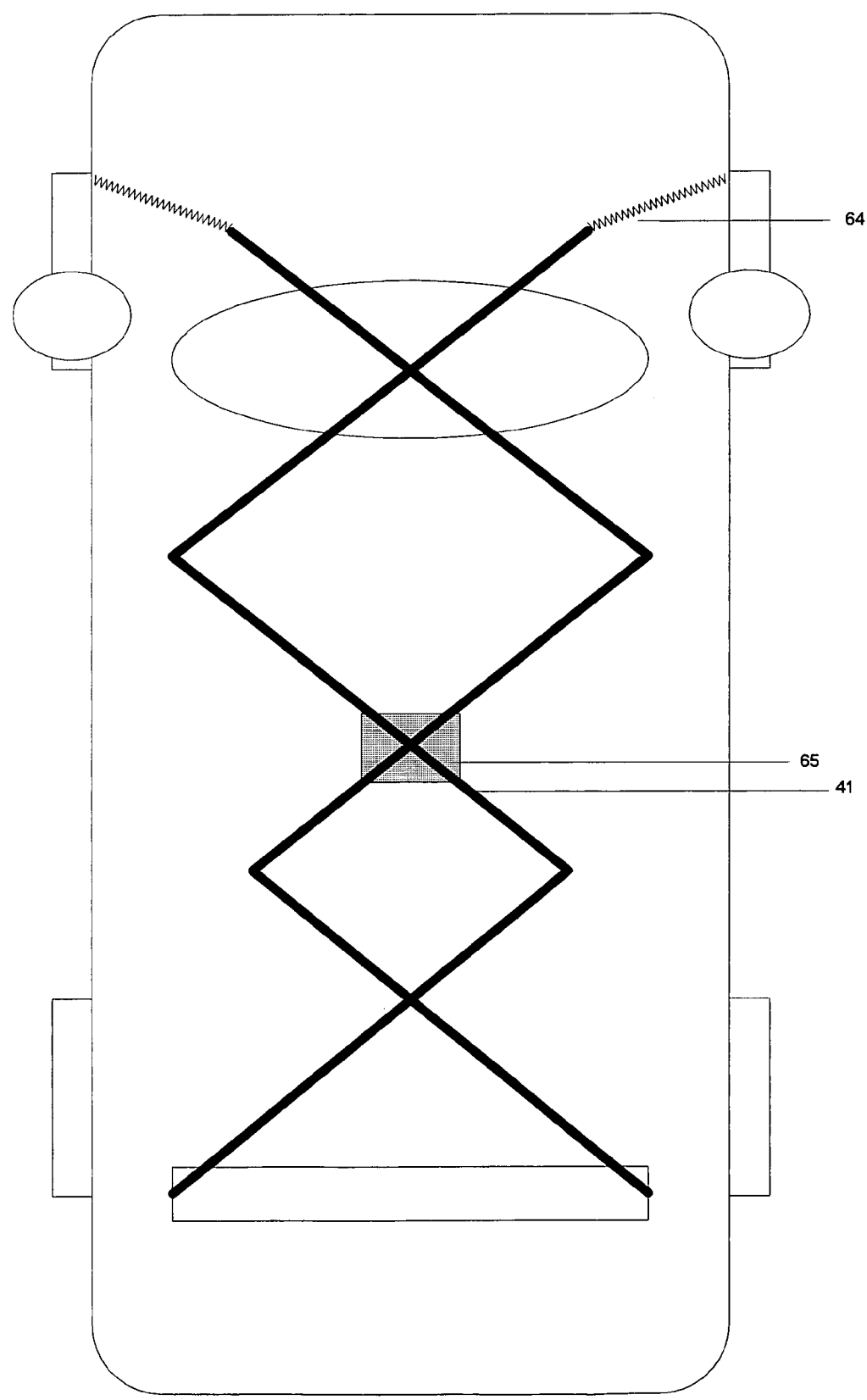
FIG. 8 is a top view of non-expandable poles arranged in an accordion support configuration.

In FIG. 8 the accordion embodiment 41 is shown with anchor points with bungee and Velcro 64 at the front wheel well fender lip. This uses fixed length poles secured together to be able to expand and contract as in an accordion. This embodiment would be necessary should a heavy duty canopy be needed. This embodiment requires a support block 65 to be in place.

Figure 9:
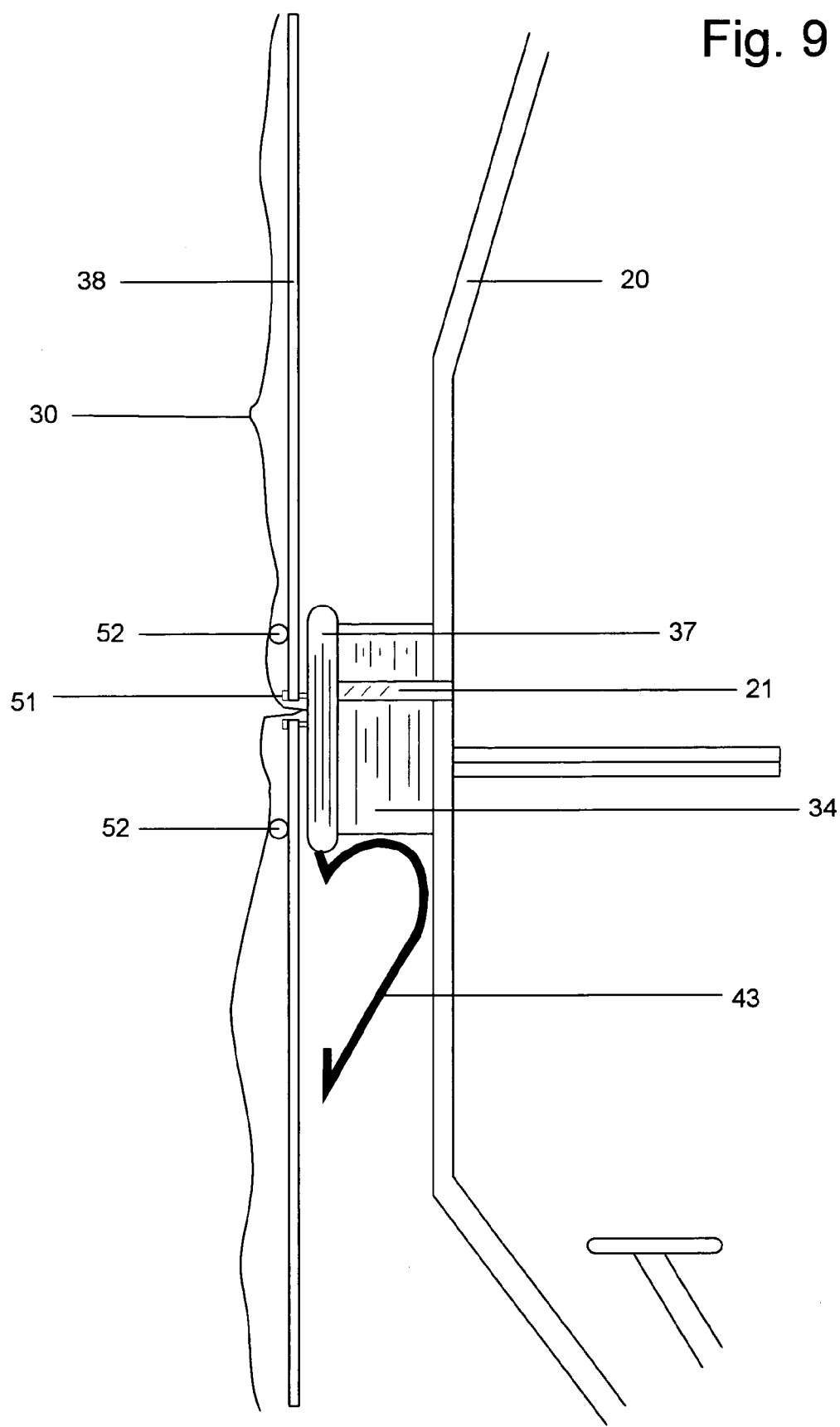
FIG. 9 is a side view of the open airfoil spoiler in the mid-roof location with expandable or non-expandable poles projecting forward and rearward.

In FIG. 9 the mid-roof embodiment is shown. This is the same airfoil shaped spoiler 43, spoiler base 34, and double risers 34 in place as embodiment shown on FIGS. 1,2,3,4,5. In this embodiment the canopy support poles 38 can either be fixed length of small diameter or a shorter version of the four section expandable poles in FIGS. 1,2,3,4,5. The airfoil spoiler embodiment is secured to the vehicle by a strap 21 running from riser to riser and into the vehicle interior through the vehicle door opening. The strap is tightened with a leveraged belt tightener and further made secure with the closing of the vehicle door. In this embodiment there are two sets of support poles 38 and two separate canopies 30. The operator may elect to deploy the forward canopy or only the rearward canopy or both.

Figure 10:
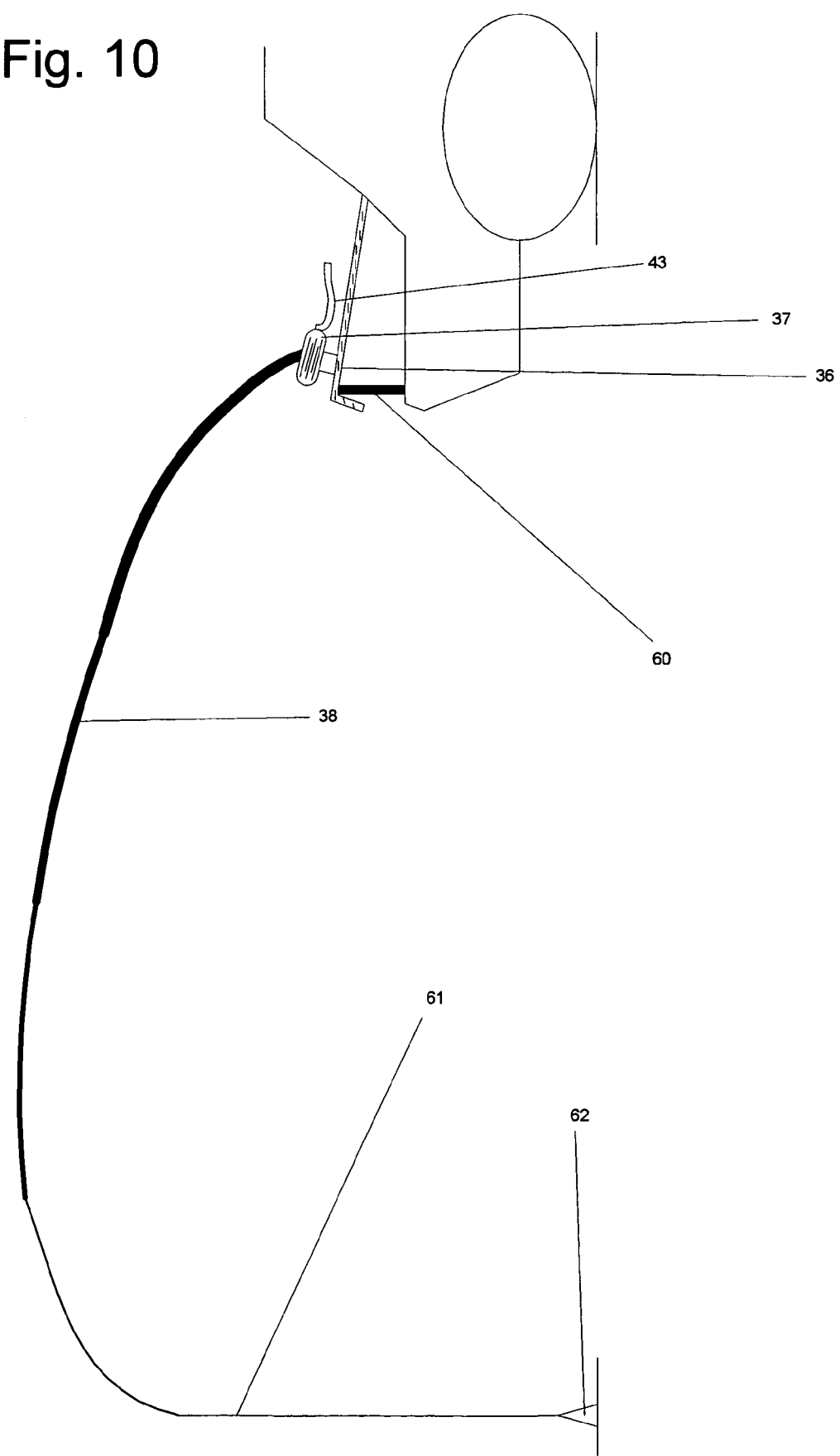
FIG. 10 is a side view showing the trunk open and the expandable rods projecting from the deployed airfoil base and anchored rearward.

FIG. 10 shows the embodiment resulting from the FIG. 1 embodiment, disconnecting the expandable poles inter connect rod, if connected, and swelling the expandable poles 180 degrees rearward. The vehicle trunk is opened to whatever angle the operator chooses. The expandable poles and canopy are deployed to make a sun shade area for passengers to sit under, picnic, view sports or have a tailgate party. The trunk can be held open by any prop 60. A string, or any other material line holds the curve and stress of the expandable poles to an anchor 62 of any material tool or implement heavy enough to hold the stress of the expandable poles.

I claim:

1. A portable, elevated, sun protection device for vehicles comprising:

a pair or risers supported by a vehicle trunk lid, said risers supporting and attached to an airfoil shaped spoiler base platform, said platform containing a cover device, said cover device including expandable poles, an interconnecting rod for one sided opening of the cover, a canopy made of aluminized polyester or similar material, bungee and VELCRO fasteners, said protection device further including an airfoil shaped cover connected to the platform by a piano hinge and a simple bayonet clip lock;

the expandable poles including pole sections of different diameters, the largest diameter poles are attached to the forward edge of the airfoil shaped spoiler base platform and include three additional, progressively smaller pole sections contained within the largest diameter pole;

wherein with the platform attached to the trunk lid, extending the three additional sections forwardly produces a continuous pole from the trunk lid to a point above the front bumper for providing sun protection for the vehicle in the forward position for the vehicle's exterior paint, wax finish, heat protection for many engine parts including electrical parts and many other components susceptible to deterioration by high temperatures;

wherein extending the three additional sections rearwardly produces a continuous pole from the trunk lid to a point above a point on the ground almost one car length aft of the vehicle's rear bumper; for providing sun protection to individuals seeking shade in an area rearward of the vehicle; and wherein the sun protection canopy device is contained in an esthetically attractive airfoil shaped spoiler concealing all of the parts and mechanics of the workings of the sun protection device when not is use and when in use, it is supported by the expandable poles in the expanded position providing sun protection for the vehicle.

* * * * *